(No Model.)
L. VAUGHAN.
PLANT PROPAGATING NEST.
No. 396,784. Patented Jan. 29, 1889.
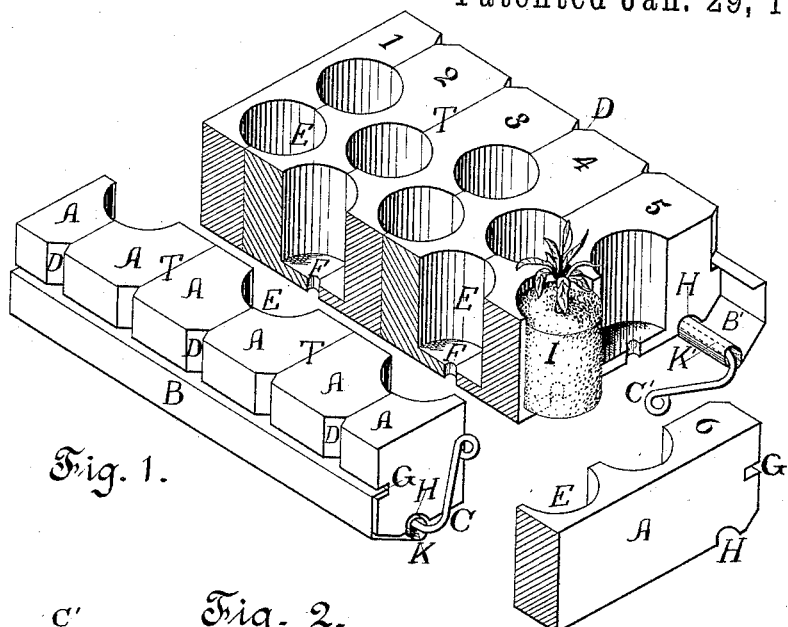
Fig. 1.
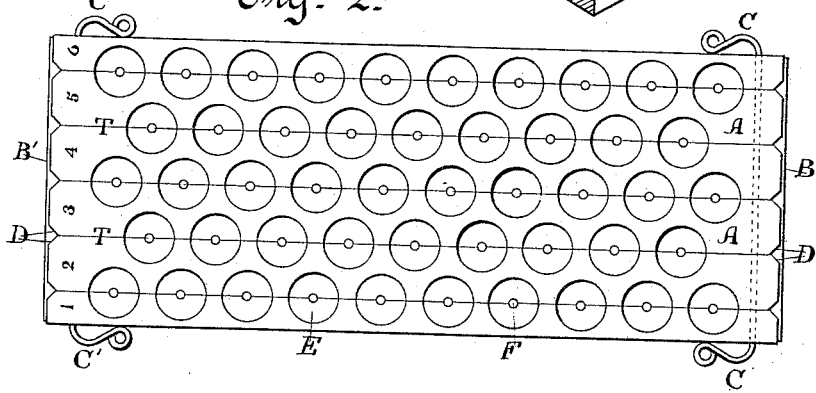
Fig. 2.
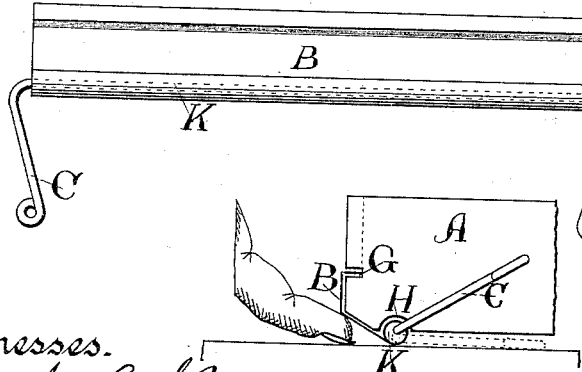
Fig. 4.
Fig. 3.
Witnesses.
A. C. Rose.
H. J. Nannah.
Inventor.
Louis Vaughan.

United States Patent Office.

LOUIS VAUGHAN, OF BLAIR, NEBRASKA.

PLANT-PROPAGATING NEST.

SPECIFICATION forming part of Letters Patent No. 396,784, dated January 29, 1889.

Application filed July 31, 1888. Serial No. 281,596. (No model.)

*To all whom it may concern:*

Be it known that I, LOUIS VAUGHAN, a citizen of the United States, residing at Blair, in the county of Washington and State of Nebraska, have invented a new and useful Plant-Propagating Nest, of which the following is a full, clear, and exact description.

My invention relates to the propagation of young plants from either cuttings, slips, or seeds; and the objects are, first, easy and quick handling of large numbers of plants; second, giving each plant separate soil and drainage without the expense of single pots for each plant, and, third, to facilitate transplanting without disturbing the soil and roots. I attain these objects by the mechanism illustrated in the accompanying drawings, forming part of this specification, and in which similar letters of reference indicate corresponding parts in all the figures.

Figure 1 is a perspective view of both ends of the nest brought near together by cutting away the center, with one of the sections removed from the numbered end. Fig. 2 is a top view of the nest put together ready for the soil and plants. Fig. 3 is an enlarged side view of one end. Fig. 4 is a view of one of the sheet-metal guides and spring-wire clamps removed from the end of the sections.

The separable numbered sections A, composing the body of the nest, and forming the walls and bottoms of the cells E, may be made of wood or any other suitable material, and the size of the nest, as well as proportion of length, width, and depth, is limited only by the size and number of cells desired in the nest.

Figs. 1 and 2 illustrate a nest to hold forty-eight plants, constructed from a wooden plank. The cylindrical pots or cells E, arranged as shown in Fig. 2, are bored nearly through the plank with an auger, leaving enough wood to form bottoms to the cells. Said bottoms are then perforated at their centers, making the small apertures F for the drainage of the cells.

The rectangular grooves G G run across the ends of the nest or plank parallel with the top and bottom, and parallel to these are made semicircular grooves H H across the bottom of the plank near each end.

The sections A, which are numbered 1, 2, 3, and so on, for convenience in putting together, are then made by slitting the plank perpendicularly through each row of cells, as shown by the lines T; or the plain sections may be bound together and the cells bored afterward.

The chamfers D are cut from the top down to the rectangular grooves G G on the sides of the sections A, where they come in contact with each other, and at their ends, as shown, to facilitate separating and removing the said sections from the guides B B' when transplanting the plants from the nest. The guides B B', for holding the sections A in position, are each made of one piece of sheet metal, having one end rolled into a bead, K, on which rest and slide the sections A at their semicircular grooves H H. The remaining part of each sheet is so bent that its other end occupies the groove G. (See Fig. 3.)

A piece of spring-wire, C, passed lengthwise through the bead K, each end curved in the manner shown, clamps the sections A together sidewise, at the same time preventing them from sliding from the guides, or the guides from sliding off of the sections, and by its elasticity allows the sections to swell and shrink without injury to the nest or its work. (See Fig. 2.) The bead K serves also as a foot at each end of the nest, holding up the sections A from the table or shelf on which they may stand, thereby preventing any obstruction of the drainage and allowing circulation of air beneath the cells.

It will be seen in Fig. 3 that the form of the guide is such as to allow the fingers to slide under to raise and handle the nest.

The wire clamp C, when pushed down to the position shown by the broken lines in Fig. 3, allows the guide to slide off from all of the sections at once, or the removal of one section at a time from the guides. (See the numbered end of Fig. 1.)

One end of section 6 in Fig. 1 is shown slipped out of guide B', showing the cylinder of soil and roots I, with the plant in position to easily remove and transplant without crumbling the soil from the roots.

Having thus fully described my invention, what I claim as new, and desire to secure by Letters Patent, is—

1. In a plant-propagating nest, the combination of a series of separable sections, A, forming a nest of cells, E, and having a rectangular groove, G, parallel with the top and bottom at each end, and a semicircular groove, H, across the bottom near each end, with the guides B B', each consisting of a single piece of sheet metal having one end rolled to form a bead, K, seated in groove H, and the remainder of the sheet so bent that the other end will enter the groove G, substantially as described.

2. In a plant-propagating nest, the separable sections A and the sheet-metal guides B B', having the beads K, in combination with the two pieces of spring-wire C C', one passed through each bead and both ends of each wire shaped so as to make a spring-clamp holding said sections together in the guides, substantially as herein shown, and for the purpose specified.

3. In a plant-propagating nest, a series of separable sections, A, having chamfers D at their ends on their sides of contact with each other, in combination with the guides B B' and the spring-wire clamps C C', substantially as shown, and for the purpose specified.

4. In a plant-propagating nest, the separable sections A, in combination with the spring-clamps C C', which elastically bind the sections snugly together, and from which the sections may be released at will and separated from each other, substantially as set forth.

5. The combined guide, foot, and elastic clamp for holding in position, supporting, and binding together the separable sections, consisting of a single piece of sheet metal, one end rolled to form a bead, K, and the remainder of the sheet bent as shown, in combination with a single piece of spring-wire passed loosely through the bead K, the ends thereof being bent to form a spring-clamp, substantially as shown and described.

LOUIS VAUGHAN.

Witnesses:
N. E. NOYES,
ELLA A. VAUGHAN.